United States Patent [19]
Brookins

[11] Patent Number: 6,022,083
[45] Date of Patent: Feb. 8, 2000

[54] SKID STEER WHEEL MECHANISM

[76] Inventor: Ernie Brookins, 913 W. Main Ave., West Fargo, N. Dak. 58078

[21] Appl. No.: 09/137,467

[22] Filed: Aug. 20, 1998

[51] Int. Cl.⁷ .................................................... B60B 35/00
[52] U.S. Cl. .................... 301/124.1; 301/6.5; 301/105.1; 301/137
[58] Field of Search ................................ 301/6.5, 105.1, 301/124.1, 137; 180/6.48

[56] References Cited

U.S. PATENT DOCUMENTS

| | | | |
|---|---|---|---|
| 4,168,757 | 9/1979 | Mather et al. | 180/6.48 |
| 4,407,381 | 10/1983 | Oswald et al. | 180/6.48 |
| 5,201,378 | 4/1993 | Bamford | 301/110.5 |
| 5,281,004 | 1/1994 | O'Leary | 301/105.1 |
| 5,658,053 | 8/1997 | Vencill et al. | 301/105.1 |
| 5,757,084 | 5/1998 | Wagner | 301/105.1 |

*Primary Examiner*—D. Glenn Dayoan
*Assistant Examiner*—Long Bao Nguyen
*Attorney, Agent, or Firm*—David Lingbeck

[57] ABSTRACT

A skid steer wheel mechanism including wheel axles rotatably disposed through axle housings which are securely mounted to the body or frame of the skid steer, and also including hub members which are cylinders with annular flanges centrally-disposed about the circumference of the hub members, and which is balanced upon pairs of bearings to equally distribute the weight and substantially abnormal wear to the bearings during the use thereof, each pair of bearings being spaced-apart inside the cylinder. The hub members are coupled to the wheel axles with disc-shaped coupler members having an internally-splined slot centrally-disposed in one side thereof and being adapted to receivably engage an end portion of the wheel axle.

9 Claims, 3 Drawing Sheets

SKID STEER WHEEL MECHANISM

BACKGROUND OF THE INVENTION

This invention relates to a skid steer wheel mechanism which substantially reduces the load and the torque placed upon the hub members of the skid steer.

Normally, a lot of weight from the frame and body and load of a skid steer is placed upon the hub members of the wheels. Overtime the hub members begin to twist and become angled due to the weight placed upon the hub members from the weight of the skid steer and of the loads moved by the skid steer. Instead of the frame being used to carry the weight and load of the skid steer, the hub members carry all the weight and load. The hub members of skid steers generally are mounted to the axles with each hub member resting upon a single bearing which is disposed about the axle. Because of the weight, the hub members, overtime, exert uneven pressure upon the single bearings which tend to wear out quite rapidly. The weight of the skid steer and any loads carried by it should be borne by the frame of the skid steer itself rather than the axles and hub members. The present invention shifts the weight to the frame or body of the skid steer and also substantially reduces the wear exerted upon the hub member bearings.

SUMMARY OF THE INVENTION

The present invention relates to a skid steer wheeling mechanism comprising a plurality of stub axles, a plurality of hub support members fixedly attached to the frame or body of the skid steer with mounting brackets which are welded to the hub support members and securely fastened to the frame or body of the skid steer, and also comprising a plurality of hub members rotatably mounted about the hub support members with each hub member being supported by a pair of bearings to evenly balance the hub member about the hub support member, and further comprising a plurality of coupler members to couple the axles to the hub members for rotation therewith.

One objective of the present invention is to provide a skid steer wheel mechanism which allows the hub members to essentially float upon the hub support members.

Another objective of the present invention is to provide a skid steer wheel mechanism which provides even stability to the sides of the hub members rather than just to one side of the hub member as is provided by the prior art.

Yet another objective of the present invention is to provide a skid steer mounting mechanism which shifts the weight of the skid steer to the frame or body thereof rather than to the axles.

Further objectives and advantages of the present invention will become apparent as the description proceeds and when taken in conjunction with the accompanying drawings wherein:

DETAILED DESCRIPTION OF THE INVENTION

Figure 1:
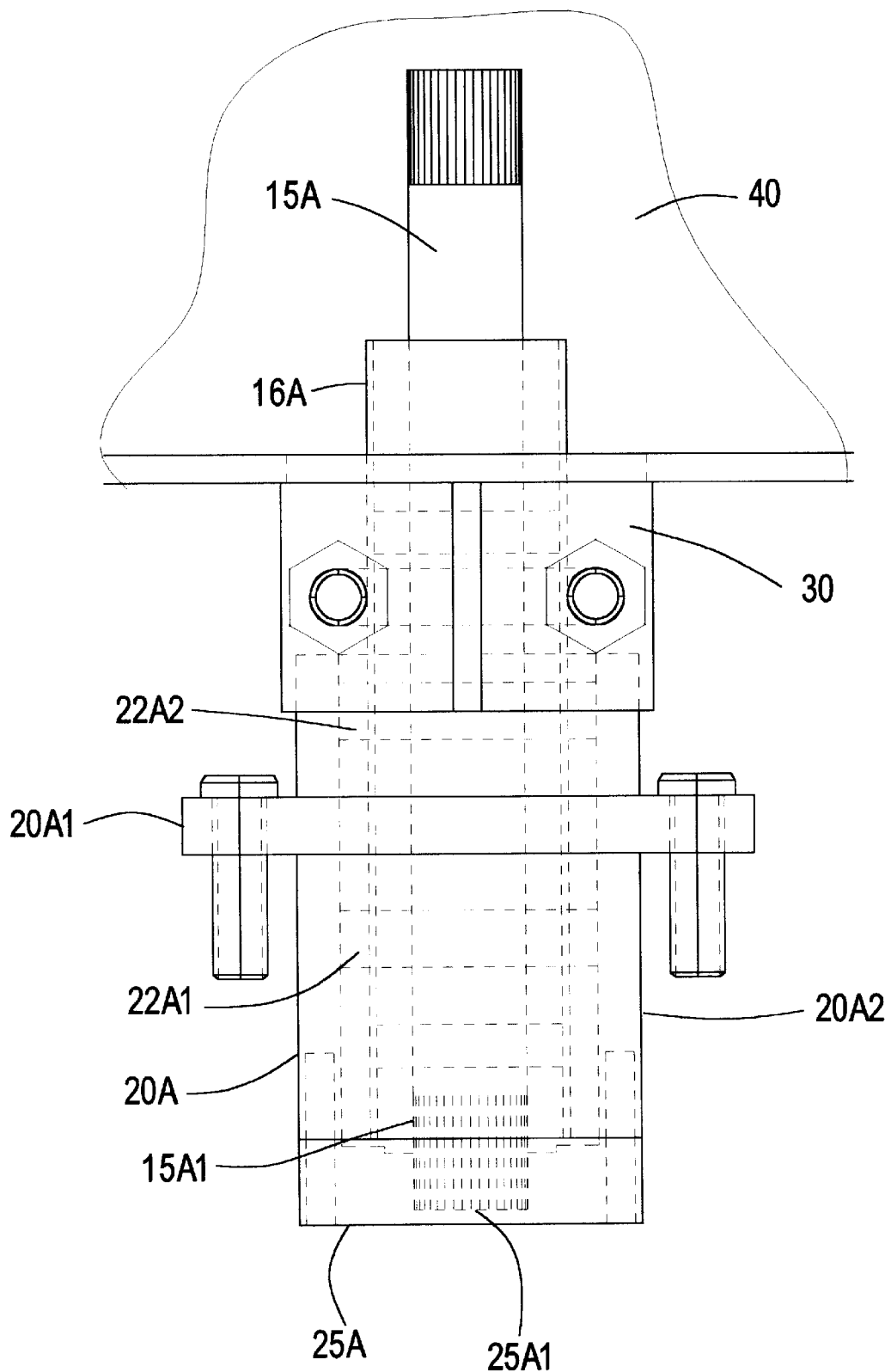
FIG. 1 is a top plan view of a skid steer frame including the hidden features of the wheel mechanism.
Figure 2:
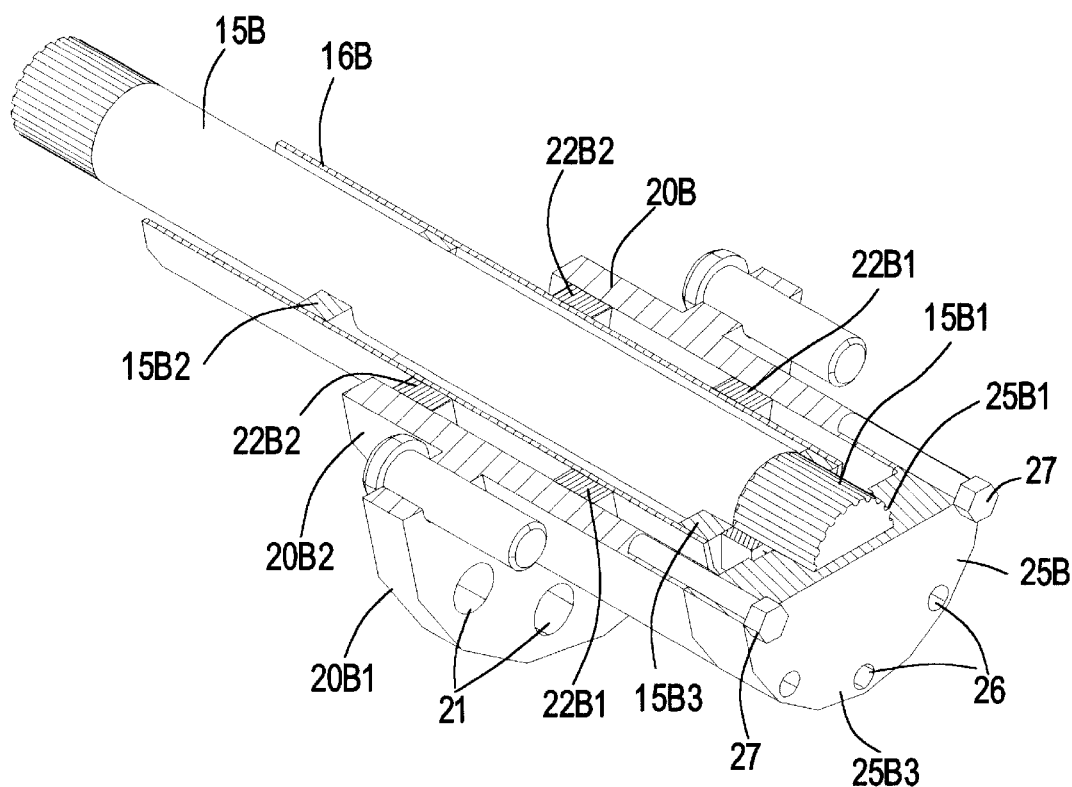
FIG. 2 is a cross-sectional detail perspective view of a skid steer wheel mechanism.
Figure 3:
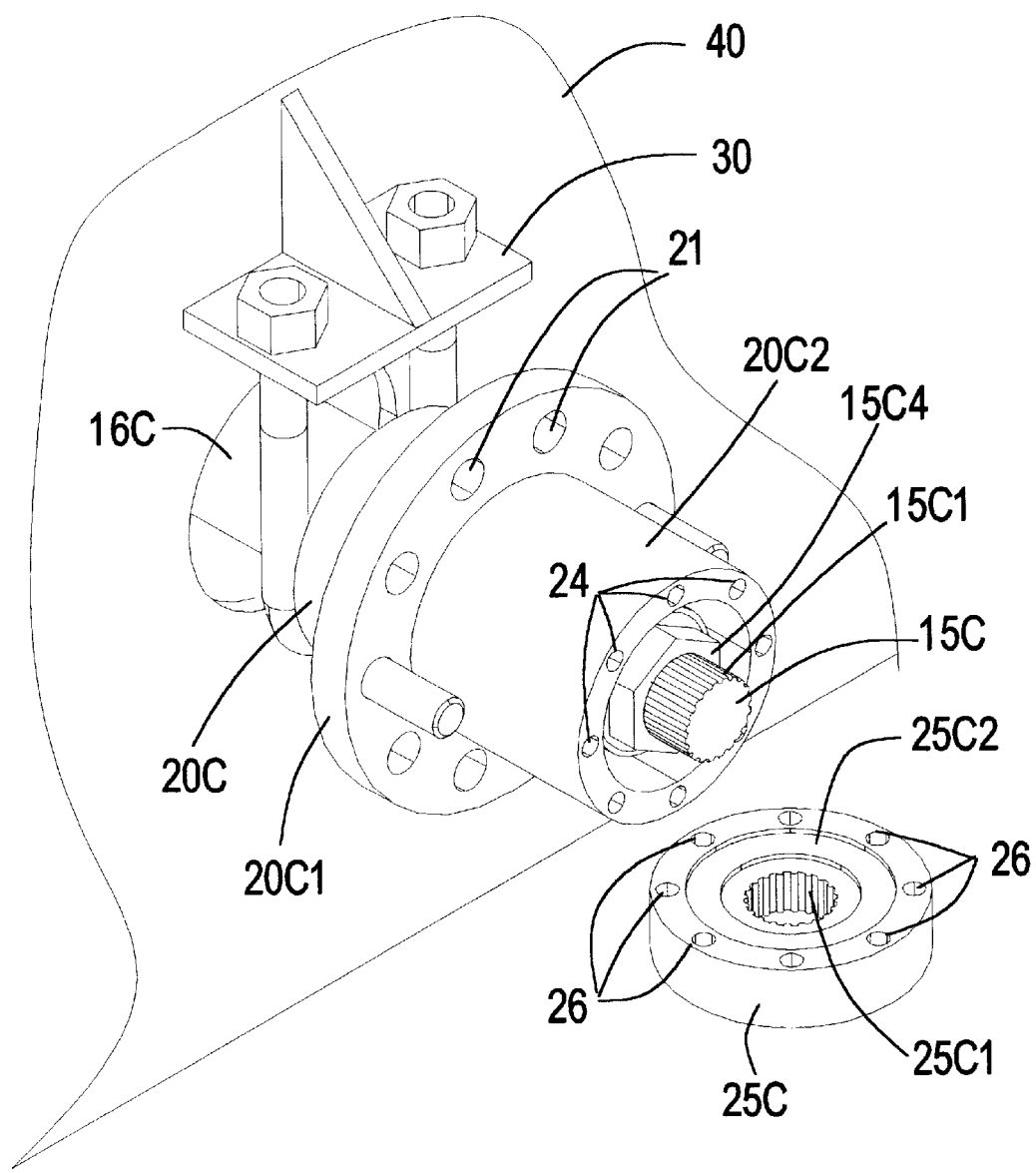
FIG. 3 is a detail view of a coupler of the skid steer wheel mechanism showing, in particular, the side which faces the axle.

Referring to the drawings in FIGS. 1–3, in particular, the skid steer wheel mechanism comprises a plurality of stub wheel axles 15A–C each of which has a set of splines 15A1–C1 at an end thereof and has a pair of bearing members 15B2–B3 mounted thereabout, and further comprises a plurality of axle housings 16A–C each of which includes a cylinder having a bore extending therethrough with the bore being adapted to rotatably receive a stub axle 15A–C and the pair of bearing members 15B2–B3 which are mounted about the stub axle 15A–C with a conventional fastener 15C4 such as a locking nut. The skid steer wheel mechanism also comprises a plurality of hub members 20A–C each of which includes a cylinder 20A2–C2 having a bore therethrough and also includes an annular flange 20A1–C1 intermediately, circumferentially and integrally disposed about the exterior of the cylinder 20A2–C2 and having a plurality of holes 21 spaced near the outer perimeter thereof. In addition, each hub member 20A–C has a plurality of holes 24 circumferentially spaced in an end of the cylinder 20A2–C2 and is rotatably mounted upon a respective one of the axle housings 16A–C, and is further supported by a pair of bearings 22A1,A2,B1,B2 which are also securely mounted about a respective axle housing 16A–C and also disposed inside the bore of the cylinder 20A2–C2 of the hub member 20A–C with the bearings 22A1,B1,A2,B2 being spaced apart and also with one bearing 22A1,B1 being disposed near one end of the cylinder 20A2–C2 of the hub member 20A–C and the other bearing 20A2–B2 being disposed near the other end of the cylinder 20A2–C2 of the hub member 20A–C to substantially balance and stabilize the hub member 20A–C to prevent rapid wearing out of the bearings 22A1,B1,A2,B2. The wheel axles 15A–C are coupled to the hub members 20A–C with a plurality of coupler members 25A–C each of which includes an essentially disc-shaped cap member having two sides 25B3,25C2 with one side 25C2 having a centrally-disposed, internally-splined slot 25A1–C1 adapted to engageably receive the externally-splined end 15A1–C1 of the wheel axle 15A–C. The disc-shaped cap member also includes a plurality of holes 26 spaced along the outer edge of the cap member and extending from one side through the other side, and is securely fastened to the outer end of the hub member 20A–C with bolts or other conventional fasteners 27 and with the externally-splined end 15A1–C1 of the wheel axle 15A–C being engaged with the internally-splined slot 25A1–C1 of the cap member 25A–C.

In operation, the wheel axles 15A–C rotate the coupler members 25A–C which, in turn, rotate the hub members 20A–C to which the wheels and tires are mounted with conventional means. Instead of the hub members 20A–C bearing the weight of the skid steer, the body 40 or frame of the skid steer bears the entire weight with a plurality of mounting brackets 30 being securely attached with conventional means to the outsides of the axle housings 16A–C and securely fastened with bolts to the frame or body 40 of the skid steer. The hub members 20A–C essentially float about the axle housings 16A–C and are balanced because each hub member 20A–C is supported by a pair of spaced-apart bearings 22A1,A2,B1,B2 and because the annular flanges 20A1–C1 are centrally disposed about the circumferences of the hub members 20A–C with the annular flanges 20A1–C1 being in planes which passes transversely through a central portion of the hub members 20A–C and between the pairs of bearings 22A1,A2,B1,B2 supporting the hub members 20A–C which are preferably equidistant from the respective planes. The prior art for skid steer wheel mechanisms do not have hub members which float upon the axle housings and which are balanced, because each hub member is commonly supported upon but one bearing which cannot evenly distribute the weight placed upon the hub member unlike the present invention.

Various changes and departures may be made to the invention without departing from the spirit and scope thereof. Accordingly, it is not intended that the invention be limited to that specifically described in the specification or as illustrated in the drawings but only as set forth in the claims.

What is claimed is:

1. A skid steer wheel mechanism comprising:

a plurality of wheel axles;

a plurality of axle housings each having a bore extending therethrough and being adapted to receive a respective said wheel axle, said axle housings being securely attached to a body of a skid steer;

a plurality of bearings mounted about said axle housings with each axle housing having a respective pair of said bearings mounted thereabout;

a plurality of hub members rotatably and securely mounted upon said axle housings and being supported upon said plurality of bearings, each of said hub members including a cylinder having a bore extending therethrough, and further including an annular flange disposed about a circumference of said cylinder; and a plurality of coupler members engaged to said wheel axles for rotation therewith and fastened to said hub members.

2. A skid steer wheel mechanism as described in claim 1, further comprising a plurality of mounting brackets securely fastened to a body of a skid steer and to said plurality of said axle housings.

3. A skid steer wheel mechanism as described in claim 1, wherein said flange member is centrally disposed about said hub member and is in a plane which essentially passes transversely through a central portion of said cylinder.

4. A skid steer wheel mechanism as described in claim 3, wherein a pair of said bearings is received inside of said bore of a respective said hub member.

5. A skid steer wheel mechanism as described in claim 4, wherein said pair of said bearings are disposed on opposite sides of the plane which passes transversely through said central portion of said cylinder and are essentially equidistant from the plane to substantially balance and float said respective hub member.

6. A skid steer wheel mechanism as described in claim 5, wherein each of said coupler members is generally disc-shaped and has two sides with a respective said wheel axle being engaged through one of said sides for rotation therewith.

7. A skid steer wheel mechanism as described in claim 6, wherein one of said sides of said coupler member includes an internally splined slot centrally disposed therein and being adapted to engageably receive an end portion of a respective one of said wheel axles.

8. A skid steer wheel mechanism as described in claim 7, wherein each of said coupler members has a plurality of holes extending therethrough along a perimeter thereof for fastening to a respective said hub member.

9. A skid steer wheel mechanism as described in claim 8, wherein each of said hub members has a plurality of holes extending in an end of said cylinder which essentially match said holes in a respective said coupler member through which fasteners extend to securely fasten said coupler member to said hub member for rotation therewith.

* * * * *